United States Patent
Kim

(10) Patent No.: US 12,388,554 B2
(45) Date of Patent: Aug. 12, 2025

(54) METHOD AND APPARATUS FOR OVERLOADING DATA AND USER EQUIPMENTS IN WIRELESS COMMUNICATION SYSTEM

(71) Applicant: ELECTRONICS AND TELECOMMUNICATIONS RESEARCH INSTITUTE, Daejeon (KR)

(72) Inventor: Hee Wook Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 59 days.

(21) Appl. No.: 18/365,356

(22) Filed: Aug. 4, 2023

(65) Prior Publication Data
US 2024/0048264 A1    Feb. 8, 2024

(30) Foreign Application Priority Data

Aug. 8, 2022   (KR) ................. 10-2022-0098391

(51) Int. Cl.
| | | |
|---|---|---|
| H04J 13/00 | (2011.01) | |
| H04J 13/16 | (2011.01) | |
| H04L 5/00 | (2006.01) | |

(52) U.S. Cl.
CPC .......... *H04J 13/0048* (2013.01); *H04J 13/16* (2013.01); *H04L 5/0048* (2013.01)

(58) Field of Classification Search
None
See application file for complete search history.

(56) References Cited

U.S. PATENT DOCUMENTS

| | | | |
|---|---|---|---|
| 8,392,783 B2 | 3/2013 | Kang et al. | |
| 8,767,805 B2 | 7/2014 | Bittner et al. | |
| 9,432,107 B2 | 8/2016 | Kim | |
| 9,955,356 B2 | 4/2018 | Xiong et al. | |
| 10,547,375 B1 | 1/2020 | Iyer et al. | |
| 10,700,838 B2 * | 6/2020 | Bayesteh | H04L 5/0051 |
| 2002/0122403 A1 * | 9/2002 | Hashem | H04W 72/02 370/335 |
| 2003/0072305 A1 * | 4/2003 | Odenwalder | H04W 72/23 370/329 |

(Continued)

FOREIGN PATENT DOCUMENTS

GB   2495709 A   *   4/2013 ............. H04B 1/707

OTHER PUBLICATIONS

A.B. Awoseyila et al., "Improved time diversity for LTE over satellite using split multicode transmission", Electronics Letters, vol. 46, No. 10, May 13, 2010.

*Primary Examiner* — Kodzovi Acolatse
(74) *Attorney, Agent, or Firm* — Rabin & Berdo, P.C.

(57) ABSTRACT

A method of a base station may comprise: mapping at least one port of the base station to each of a plurality of user equipments (UEs) to be overloaded; configuring overloading signatures for a code division multiplexing (CDM) scheme; mapping the overloading signatures with the plurality of UEs to be overloaded, respectively; transmitting a message including configuration information of the overloading signatures to the plurality of UEs; and transmitting, to the plurality of UEs, signals multiplexed by the CDM scheme using the overloading signatures.

11 Claims, 9 Drawing Sheets

(56) References Cited

U.S. PATENT DOCUMENTS

| | | | |
|---|---|---|---|
| 2003/0210668 A1* | 11/2003 | Malladi | H04L 1/0015 |
| | | | 370/335 |
| 2003/0210669 A1* | 11/2003 | Vayanos | H04L 1/1851 |
| | | | 370/335 |
| 2003/0210735 A1* | 11/2003 | Ahn | H04B 1/712 |
| | | | 375/E1.032 |
| 2006/0105796 A1* | 5/2006 | Malladi | H04W 52/146 |
| | | | 455/522 |
| 2007/0104150 A1* | 5/2007 | Fernandez-Corbaton | |
| | | | H04B 7/2618 |
| | | | 370/335 |
| 2009/0034483 A1* | 2/2009 | Dominique | H04L 1/1825 |
| | | | 370/335 |
| 2009/0103497 A1* | 4/2009 | Fernandez-Corbaton | |
| | | | H04B 1/707 |
| | | | 370/335 |
| 2012/0155412 A1* | 6/2012 | Kawamura | H04J 13/0074 |
| | | | 375/147 |
| 2016/0182143 A1 | 6/2016 | Seel | |
| 2021/0218490 A1 | 7/2021 | Nammi et al. | |

* cited by examiner

METHOD AND APPARATUS FOR OVERLOADING DATA AND USER EQUIPMENTS IN WIRELESS COMMUNICATION SYSTEM

CROSS-REFERENCE TO RELATED APPLICATIONS

This application claims priority to Korean Patent Application No. 10-2022-0098391, filed on Aug. 8, 2022, with the Korean Intellectual Property Office (KIPO), the entire contents of which are hereby incorporated by reference.

BACKGROUND

1. Technical Field

Exemplary embodiments of the present disclosure relate to an overloading technique in a wireless communication system, and more specifically, to a technique for overloading data and user equipments (UEs).

2. Related Art

The communication system (hereinafter, a New Radio (NR) communication system) using a higher frequency band (e.g., a frequency band of 6 GHz or higher) than a frequency band (e.g., a frequency band of 6 GHz or lower) of the Long Term Evolution (LTE) (or, LTE-A) communication system is being considered for processing of soaring wireless data. The NR communication system may support not only a frequency band below 6 GHz but also 6 GHz or higher frequency band, and may support various communication services and scenarios as compared to the LTE communication system. In addition, the requirements of the NR communication system may include enhanced mobile broadband (eMBB), ultra-reliable low-latency communication (URLLC), massive machine type communication (mMTC), and the like.

In the future, mobile communication networks are expected to evolve in the direction of combining or cooperating with terrestrial networks and satellite networks. In such a satellite network and an integrated system of a satellite network, commonality between a satellite radio interface and a terrestrial radio interface may be considered in consideration of costs. Compared to a terrestrial network, a satellite network may have characteristics such as a long round-trip delay time, a delay time difference between terminals, a large cell coverage, a large Doppler shift between base station and terminal, and/or a power-limited satellite environment. There is a need for a transmission method in a satellite radio interface having commonality with a terrestrial radio interface while reflecting these characteristics.

SUMMARY

Exemplary embodiments of the present disclosure are directed to providing a method for overloading data and/or UEs in a wireless communication system.

According to a first exemplary embodiment of the present disclosure, a method of a base station may comprise: mapping at least one port of the base station to each of a plurality of user equipments (UEs) to be overloaded; configuring overloading signatures for a code division multiplexing (CDM) scheme; mapping the overloading signatures with the plurality of UEs to be overloaded, respectively; transmitting a message including configuration information of the overloading signatures to the plurality of UEs; and transmitting, to the plurality of UEs, signals multiplexed by the CDM scheme using the overloading signatures.

When a number M of the plurality of UEs to be overloaded is less than or equal to a length L of a Walsh Hadamard code, the overloading signatures may be configured based on L Walsh Hadamard codes having orthogonality, and each of M and L is a natural number.

When a number M of the plurality of UEs to be overloaded is greater than a length L of a Walsh Hadamard code, the overloading signatures may be configured based on L Walsh Hadamard codes having orthogonality and (M-L) non-orthogonal codes, an each of M and L is a natural number.

The overloading signatures may be configured based on an equation $$\text{overloading signature}_n = \begin{cases} W_L^n (1 \le n \le L) \\ G * W_L^{n-L} (L < n \le M) \end{cases},$$

M may be a number of the plurality of UEs to be overloaded, L may be a length of a Walsh Hadamard code, $W_L^n$ may be the Walsh Hadamard code, G may be defined as $G=\text{diag}\{g_1, g_2, \ldots, g_L\}$, $g_i$ may be set so that a cross-correlation between $W_L^n$ and $G*W_L^{n-L}$ is minimized, and each of M and L is a natural number.

The overloading signatures may be configured based on an equation $$\text{overloading signature}_n = \begin{cases} H^n * W_L^n (1 \le n \le L) \\ Q^n * W_L^{n-L} (L < n \le M) \end{cases},$$

M may be a number of the plurality of UEs to be overloaded, L may be a length of a Walsh Hadamard code, $W_L^n$ may be the Walsh Hadamard code, $H^n$ may be defined as $H^n=\text{diag}\{h_1^n, h_2^n, \ldots, h_L^n\}$, $Q^n$ may be defined as $Q^n=\text{diag}\{q_1^n, q_2^n, \ldots, q_L^n\}$ and $h_i^n$ and $q_i^n$ may be set so that a cross-correlation between $H^n * W_L^n$ and $Q^n*W_L^{n-L}$ is minimized, and each of M and L is a natural number.

The overloading signatures may be configured based on an equation $$\text{overloading signature}_n = H^n * [\exp(-j*2\pi*\frac{(0+\text{offset})}{M*n}),$$

$$\exp(-j*2\pi*\frac{(1+\text{offset})}{M*n}), \ldots,$$

$$\exp(-j*2\pi*\frac{(L-2+\text{offset})}{M*n}),$$

$$\exp(-j*2\pi*\frac{(L-1+\text{offset})}{M*n})], (1 \le n \le M),$$

M may be a number of the plurality of UEs to be overloaded, L may be a length of a Walsh Hadamard code, $H^n$ may be defined as $H^n=\text{diag}\{h_1^n, h_2^n, \ldots, h_L^n\}$, offset may indicate a starting position of truncation of a discrete Fourier transform (DFT) matrix, and each of M and L is a natural number.

According to a second exemplary embodiment of the present disclosure, a method of a user equipment (UE) may comprise: receiving, from a base station, a message including configuration information of an overloading signature for a code division multiplexing (CDM) scheme; receiving, from the base station, signals multiplexed by the CDM scheme according to the overloading signature; identifying g a resource element (RE) mapping relationship between the overloading signature and a symbol based on the overloading signature; and decoding the signals based on the RE mapping relationship between the overloading signature and the symbol.

When a number M of the plurality of UEs to be overloaded is less than or equal to a length L of a Walsh Hadamard code, the overloading signatures may be configured based on L Walsh Hadamard codes having orthogonality, and each of M and L is a natural number.

When a number M of the plurality of UEs to be overloaded is greater than a length L of a Walsh Hadamard code, the overloading signatures may be configured based on L Walsh Hadamard codes having orthogonality and (M-L) non-orthogonal codes, an each of M and L is a natural number.

According to a third exemplary embodiment of the present disclosure, a base station may comprise: a processor; and a memory storing one or more instructions executable by the processor, wherein the one or more instructions are executed to perform: mapping at least one port of the base station to each of a plurality of user equipments (UEs) to be overloaded; configuring overloading signatures for a code division multiplexing (CDM) scheme; mapping the overloading signatures with the plurality of UEs to be overloaded, respectively; transmitting a message including configuration information of the overloading signatures to the plurality of UEs; and transmitting, to the plurality of UEs, signals multiplexed by the CDM scheme using the overloading signatures.

The overloading signatures may be configured based on spreading codes and transmit power allocation.

When a number M of the plurality of UEs to be overloaded is greater than a length L of a Walsh Hadamard code, the overloading signatures may be configured based on L Walsh Hadamard codes having orthogonality and (M-L) non-orthogonal codes, an each of M and L is a natural number.

The overloading signatures may be configured based on an equation $$\text{overloading signature}_n = \begin{cases} H^n * W_L^n (1 \le n \le L) \\ Q^n * W_L^{n-L} (L < n \le M) \end{cases},$$

M may be a number of the plurality of UEs to be overloaded, L may be a length of a Walsh Hadamard code, $W_L^n$ may be the Walsh Hadamard code, $H^n$ may be defined as $H^n = \text{diag}\{h_1^n, h_2^n, \ldots, h_L^n\}$, $Q^n$ may be defined as $Q^n = \text{diag}\{q_1^n, q_2^n, \ldots, q_L^n\}$ and $h_i^n$ and $q_i^n$ may be set so that a cross-correlation between $H^n * W_L^n$ and $Q^n * W_L^{n-L}$ is minimized, and each of M and L is a natural number.

According to the present disclosure, the number of simultaneously accessible channels can be increased, frequency efficiency can be increased, and coverage can be extended through a data and/or UE overloading method. In addition, according to the present disclosure, communication is performed based on data and/or UE overloading by utilizing a multiple-input multiple-output (MIMO) transmission block of a system through a data and/or UE overloading transmission structure, thereby minimizing impacts on technical specifications of the system and minimizing changes in hardware and software of terminals and/or base stations.

DETAILED DESCRIPTION OF THE EMBODIMENTS

Figure 1:
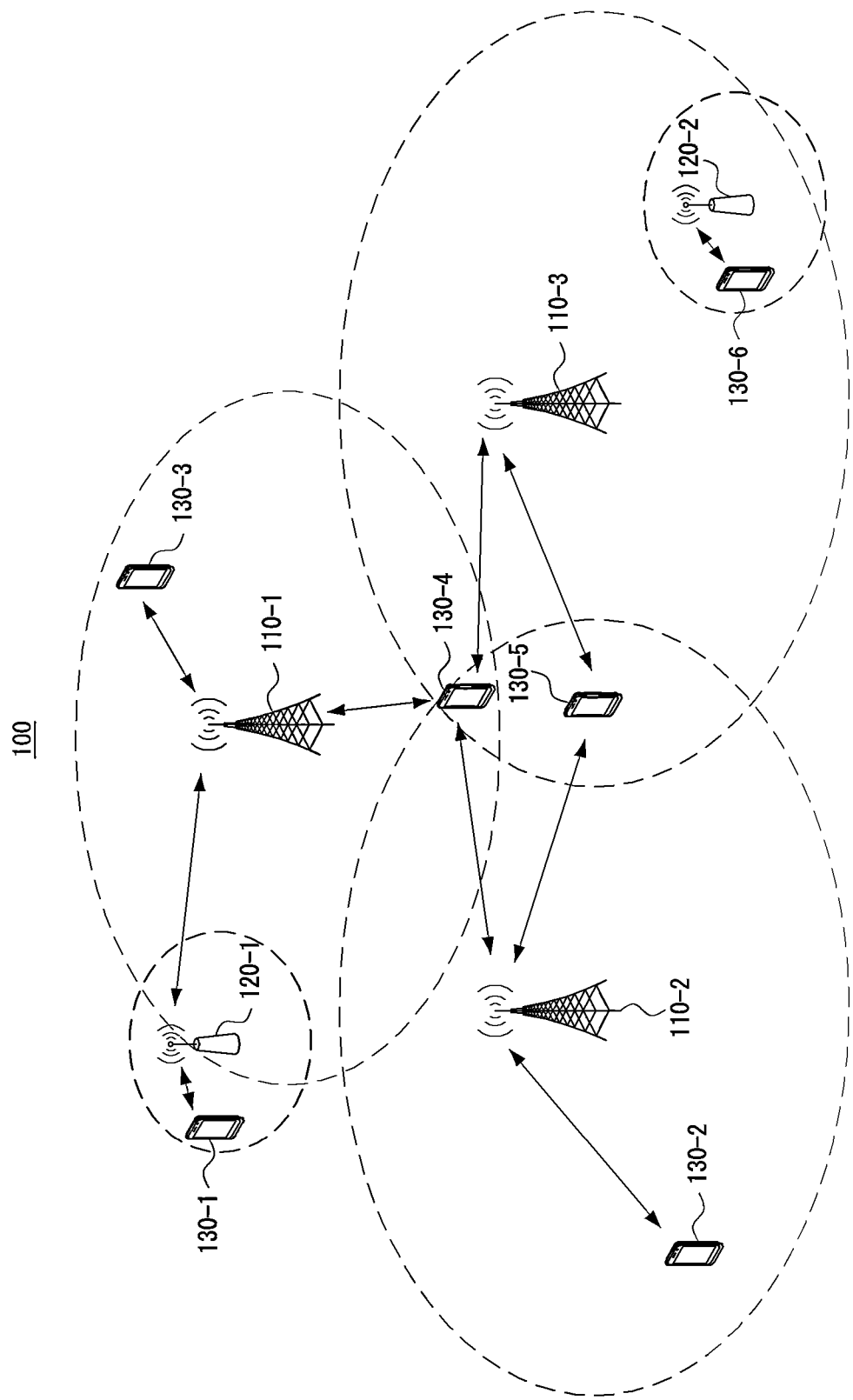
FIG. 1 is a conceptual diagram illustrating a first exemplary embodiment of a communication system.

A communication system to which exemplary embodiments according to the present disclosure are applied will be described. A communication system to which exemplary embodiments according to the present disclosure are applied is not limited to the content described below, and exemplary embodiments according to the present disclosure may be applied to various communication systems. Here, a communication system may be used in the same meaning as a communication network.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced (LTE-A) network, 5G mobile communication network, or the like.

Throughout the present disclosure, a terminal may refer to a mobile station, mobile terminal, subscriber station, portable subscriber station, user equipment, an access terminal, or the like, and may include all or a part of functions such as the terminal, mobile station, mobile terminal, subscriber station, mobile subscriber station, user equipment, access terminal, or the like.

The above-described terminal may mean various devices having communication capability, which a user of a mobile communication service can use, such as a desktop computer, laptop computer, tablet PC, wireless phone, mobile phone, smart phone, smart watch, smart glass, virtual reality (VR) glass, e-book reader, portable multimedia player (PMP), portable game console, navigation device, digital camera, digital multimedia broadcasting (DMB) player, digital audio recorder, digital audio player, digital picture recorder, digital picture player, digital video player, or the like.

Throughout the present disclosure, the base station may refer to an access point, radio access station, node B, evolved node B (eNodeB), base transceiver station, mobile multihop relay (MMR)-BS, or the like, and may include all or part of functions such as the base station, access point, radio access station, nodeB, eNodeB, base transceiver station, and MMR-BS.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, as an example of a wireless access system for which exemplary embodiments of the present disclosure can be used, a 3rd generation partnership project (3GPP) NR system as well as a 3GPP LTE/LTE-A system may be described. Hereinafter, in order to clarify the description of the present disclosure, the description is based on the 3GPP communication system (e.g., LTE, NR, 6G, etc.), but the technical spirit of the present disclosure is not limited thereto.

The following techniques may be used in various access communication systems such as code division multiple access (CDMA), frequency division multiple access (FDMA), time division multiple access (TDMA), orthogonal frequency division multiple access (OFDMA), and single carrier frequency division multiple access (SC-FDMA).

A communication system or a memory system to which exemplary embodiments according to the present disclosure are applied will be described. A communication system or a memory system to which exemplary embodiments according to the present disclosure are applied is not limited to the contents described below, and exemplary embodiments according to the present disclosure may be applied to various communication systems. Here, a communication system may be used in the same meaning as a communication network.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above. Also, the 6G communication may be performed in a terahertz (THz) frequency band.

For example, for the 4G, 5G, and/or 6G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC- FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
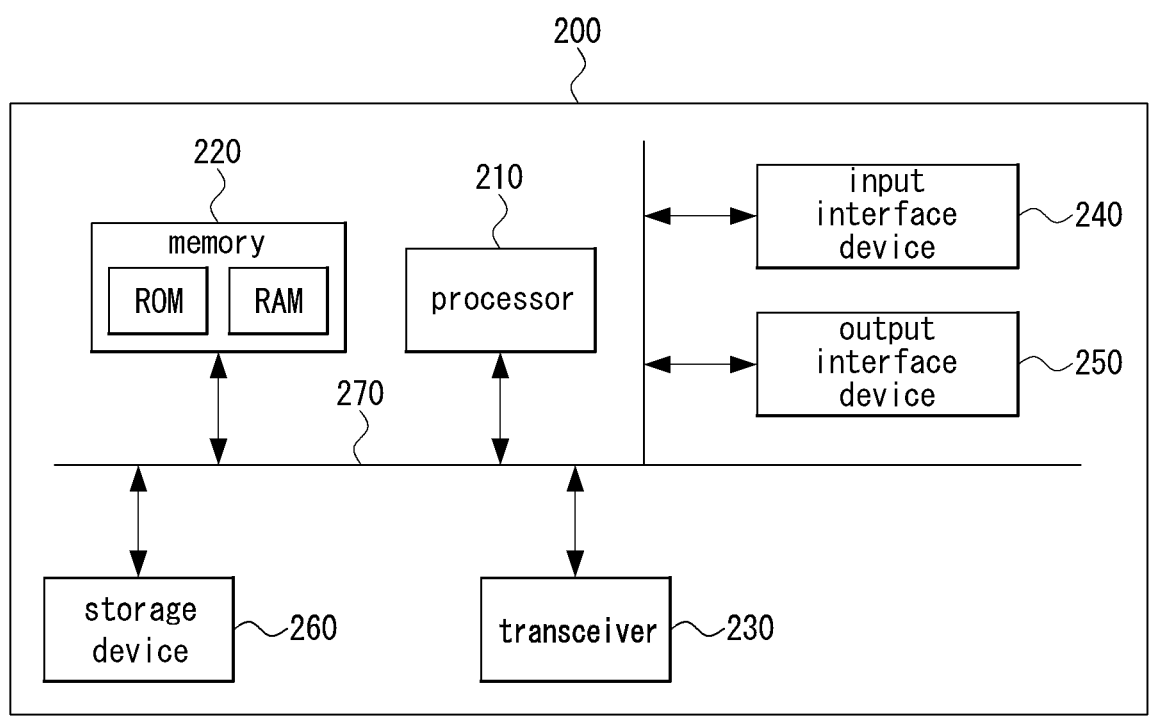
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, a small base station, a small cell base station, a femto cell base station, a micro cell base station, a picocell base station, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), multi-cell MIMO, massive MIMO, or the like), adaptive MIMO switching (AMS), coordinated multipoint (CoMP) transmission, carrier aggregation (CA) transmission, unlicensed band transmission, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

The mobile communication networks are expected to evolve in the direction of combining or cooperating with terrestrial networks (TNs) and satellite networks (or non-terrestrial networks (NTNs)). In such an integrated satellite/terrestrial system, commonality between a satellite radio interface and a terrestrial radio interface may be considered in consideration of costs of terminals. Compared to TNs, NTNs may have characteristics such as a long round-trip delay time, a delay time difference between terminals, a large cell coverage, a large Doppler shift between base station and terminal, and/or a power-limited satellite environment.

NTNs may provide interactive services in out-of-province and/or mountainous areas, provide multimedia broadcast and multicast service (MBMS) services, and complement TNs. As NTNs develop to networks that complements TNs, it may be necessary to satisfy performance requirements of TNs in major service scenarios of NTNs in order to be competitive with TNs. From this point of view, issues in downlink and/or uplink of NTNs may be summarized as follows.

Downlink
  Increase cell capacity
  Increase UE maximum transmission rate and/or user-perceived rate
  Increase the number of simultaneously supported UEs
  Reduce paging resource overhead due to increased cell size
  Improve coverage and/or link reliability
Uplink
  Increase cell capacity
  Increase UE maximum transmission rate and/or user-perceived rate
  Increase the number of simultaneously supported UEs
  Improve coverage and/or link reliability
  Support synchronized multi-access and/or non-synchronized multi-access In the case of TN, many of these issues may be solved through MIMIO techniques, but in the case of NTN, it may be difficult to apply MIMO techniques in a satellite channel environment with a low degree of freedom (DoF). Therefore, a need for an innovative transmission techniques capable of obtaining the same effects as the application of MIMO techniques in TN may be required in NTN.

On the other hand, in order to vitalize NTN services and/or terminal markets, a number of user-friendly existing TN terminal techniques may need to be applied, and NTN services may need to be provided at a cost and/or complexity similar to that of TN services. Therefore, new techniques that can replace the MIMO techniques of TNs may have to be proposed in a direction that minimizes impacts on the existing TN technical specifications, and in order to reduce the implementation complexity, a solution having low complexity may be need to address the above-described various issues. In addition, the following satellite channel environments (e.g., strong line of sight (LoS) channel environment, high low earth orbit (LEO) satellite speed, and/or long round-trip delay time) may necessarily be considered.

Strong LoS Channel Environment
  Due to a lack of DoF due to the Rician channel environment (or quasi additive white gaussian noise (AWGN) channel) with a high K-factor, it may be difficult to apply the existing TN's MIMO techniques.
  Due to a small difference between received signal powers at UEs, it may be difficult to apply the techniques (transmission and/or power control) in the power domain.
  Due to an increased channel coherence bandwidth (or flat channel), it may be difficult to apply diversity techniques.
High LEO Satellite Speed
  Due to a high Doppler shift, sequence correlation performance in the frequency domain may decrease.
  Due to a short channel coherence time, sequence coherence in the time domain may decrease.
Long Round Trip Delay Time
  Due to a long round-trip delay of UE signals within a satellite cell and/or a large difference between long round-trip delays of UE signals, it may be difficult to apply closed loop-based techniques (e.g., UE measurement report-based power control, codebook design, UE pairing, UE scheduling, and/or adaptive modulation and coding (AMC)).

Figure 3:
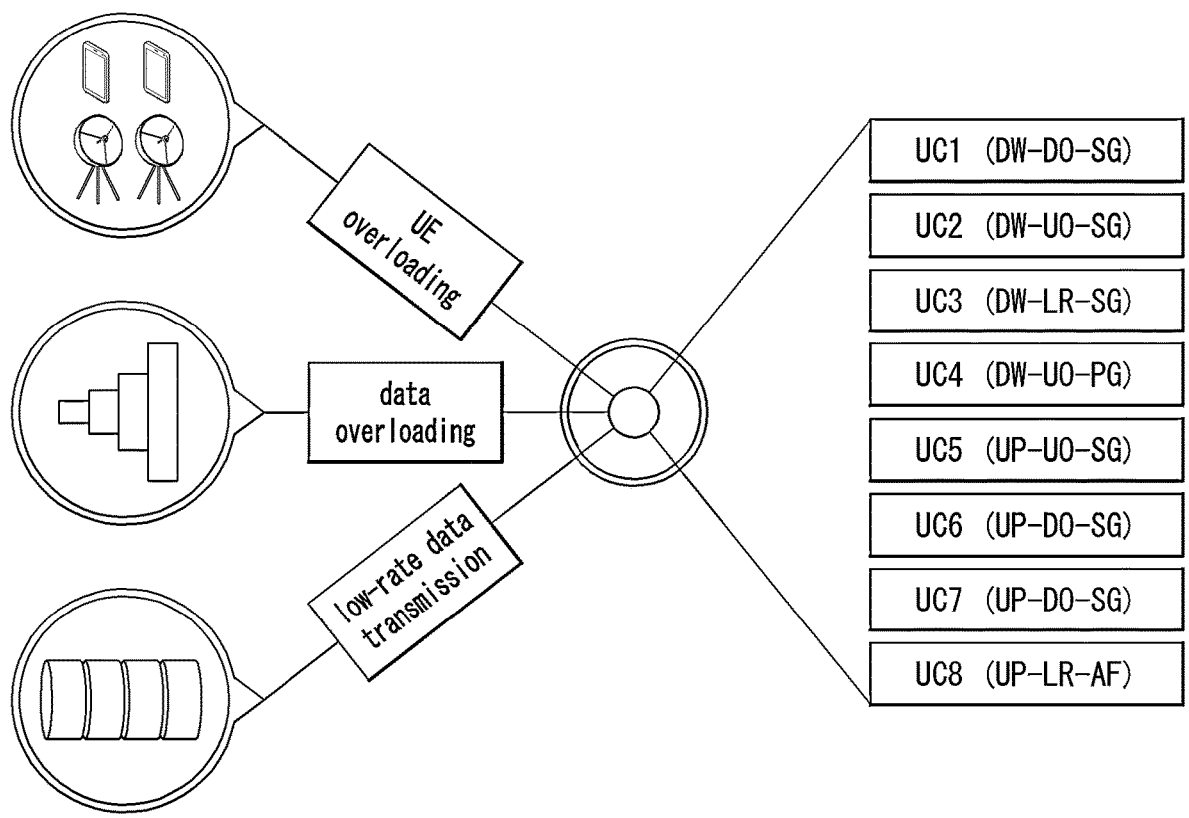
FIG. 3 is a conceptual diagram illustrating use cases and scenarios requiring data and/or UE overloading.

FIG. 3 is a conceptual diagram illustrating use cases and scenarios requiring data and/or UE overloading.

Referring to FIG. 3, a UE overloading scenario, data overloading scenario, and/or low-rate data transmission scenario may be applied to use cases (UC 1, UC 2, UC 3, UC 4, UC5, UC 6, and/or UC 7) in Table 1. In addition, Table 1 below shows use cases requiring data or UE overloading, an operation mode of a communication system (e.g., LTE or NR) for each use case, and/or a main target terminal type. Referring to FIG. 3 and Table 1 below, in each use case, data overloading, UE overloading, and low-rate data transmission based coverage enhancement transmission modes may be considered in uplink and/or downlink. Meanwhile, considering service characteristics of eMBB and mMTC, the data overloading scenario may be considered to increase the maximum transmission rate or perceived transmission rate of a very small aperture terminal (VSAT) UE mainly in downlink. In addition, the UE overloading scenario may be considered to increase the number of simultaneously-supported terminals such as handheld devices (e.g., internet of things (IoT) devices) or VSAT UEs mainly in uplink. In addition, the low-rate data transmission may be considered to improve uplink and/or downlink coverage of a power-limited handheld terminal.

TABLE 1

| link | Use case | Scenario | Operation mode | UE type | |
|---|---|---|---|---|---|
| Downlink | eMBB | Data overloading | Synchronized grant-base | Mainly VSAT | UC 1 |
| | mMTC/eMBB | UE overloading | Synchronized grant-base | Mainly handheld | UC 2 |
| | eMBB/mMTC | Low-rate data transmission | Synchronized grant-base | Mainly handheld | UC 3 |
| | eMBB/mMTC | paging | Synchronized grant-base | VSAT/handheld | UC 4 |

TABLE 1-continued

| link | Use case | Scenario | Operation mode | UE type | |
|---|---|---|---|---|---|
| Uplink | mMTC/eMBB | UE overloading | Synchronized grant-base | VSAT/handheld | UC 5 |
| | eMBB | Data overloading | Synchronized grant-base | VSAT/handheld | UC 6 |
| | eMBB/mMTC | Low-rate data transmission | Synchronized grant-base | Mainly handheld | UC 7 |
| | mMTC/eMBB | UE overloading | Non-synchronized grant-base | VSAT/handheld | UC 8 |

Figure 4:
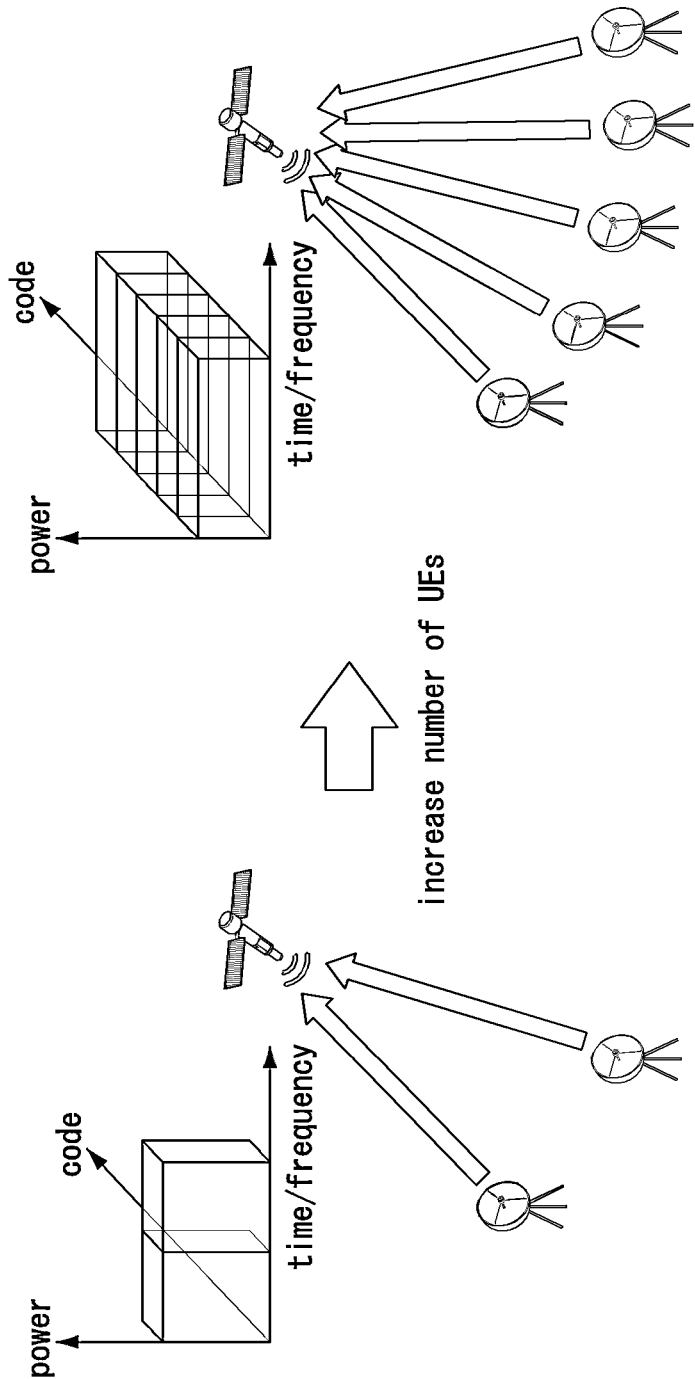
FIG. 4 is a conceptual diagram illustrating a first exemplary embodiment of a UE overloading transmission structure in uplink.

FIG. 4 is a conceptual diagram illustrating a first exemplary embodiment of a UE overloading transmission structure in uplink.

Referring to FIG. 4, a UE overloading transmission structure in uplink may overload a plurality of UEs by non-orthogonally using time resources. In addition, the UE overloading transmission structure in uplink may overload a plurality of UEs by non-orthogonally using frequency resources. In addition, the UE overloading transmission structure in uplink may overload a plurality of UEs by non-orthogonally using time and frequency resources. Accordingly, it is possible to increase the number of UEs capable of simultaneous access without serious degradation of bit error rate (BER) performance compared to the existing transmission structure that orthogonally uses time and/or frequency resources.

Figure 5:
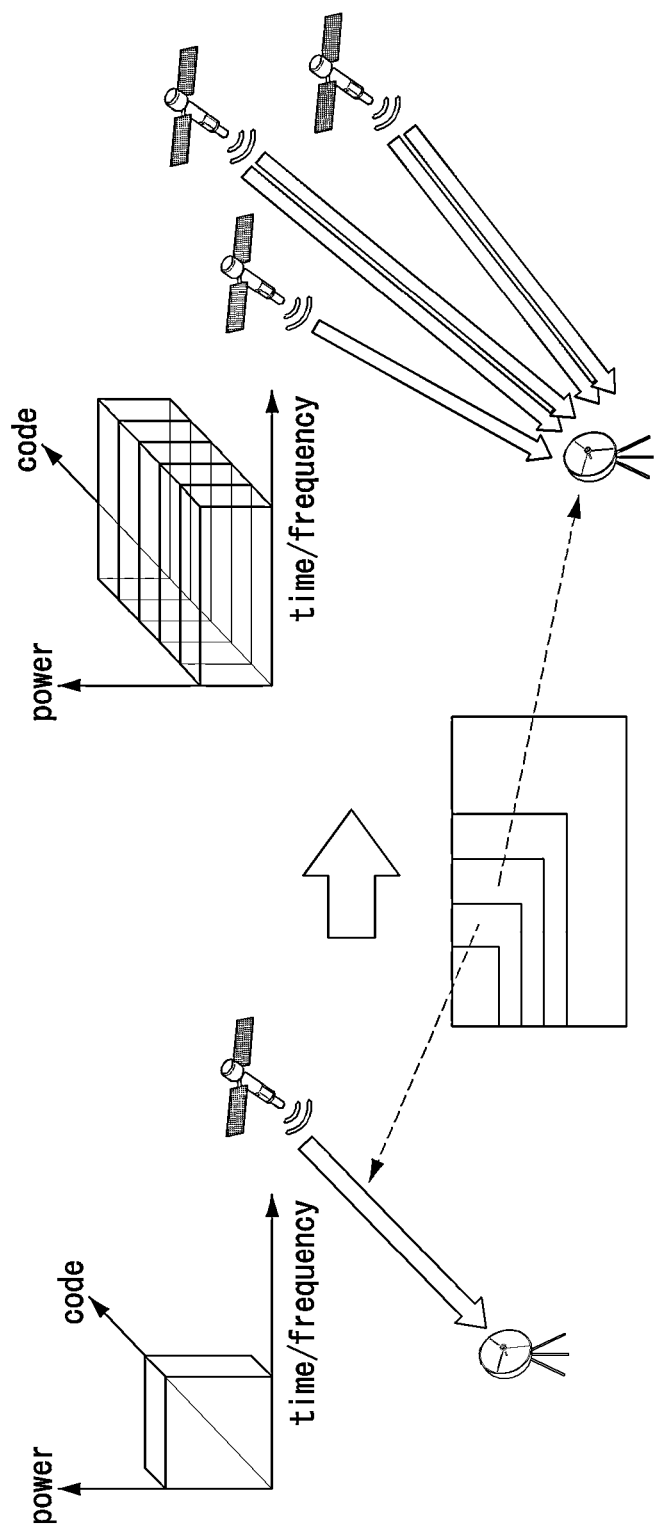
FIG. 5 is a conceptual diagram illustrating a first exemplary embodiment of a data overloading transmission structure in downlink.

FIG. 5 is a conceptual diagram illustrating a first exemplary embodiment of a data overloading transmission structure in downlink.

Referring to FIG. 5, a data overloading transmission structure in downlink may overload a plurality of data by non-orthogonally using time resources. In addition, the data overloading transmission structure in downlink may overload a plurality of data by non-orthogonally using frequency resources. In addition, the data overloading transmission structure in downlink may overload a plurality of data by non-orthogonally using time and frequency resources. Accordingly, by using time and/or frequency resources non-orthogonally compared to the existing transmission structure, one data stream transmitted in the existing orthogonal transmission may be divided into a plurality of low-rate data streams, and the individual low-rate data streams may be transmitted as being overloaded. For example, it may be applied to cooperative transmission through VSAT terminals or multiple satellites in a satellite channel environment operating in the maximum modulation and coding scheme (MCS) mode due to a very large received signal strength. Accordingly, the overall transmission rate may be increased without significant BER performance degradation.

Figure 6:
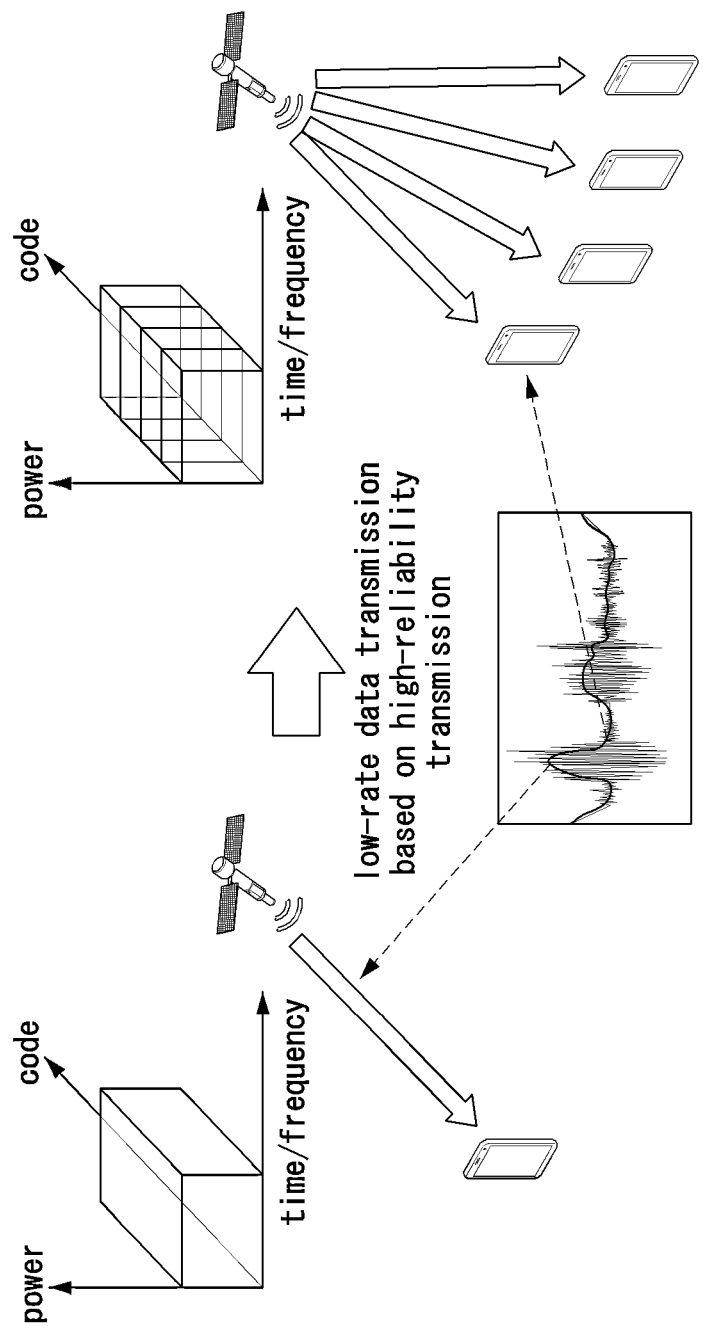
FIG. 6 is a conceptual diagram illustrating a first exemplary embodiment of a coverage enhancement transmission structure in uplink and/or downlink.

FIG. 6 is a conceptual diagram illustrating a first exemplary embodiment of a coverage enhancement transmission structure in uplink and/or downlink.

Referring to FIG. 6, in the case of a handheld terminal in a power-limited satellite environment, it may be difficult to secure coverage and link reliability. Therefore, a transmission technique capable of improving coverage with high reliability may be required. In the case of a satellite service based on a handheld terminal, considering low-rate voice services through application of a low-rate voice codec compared to that of TN and low-rate data services, the minimum resource allocation unit (e.g., 12 subcarriers×1 TTI transmission time interval (TTI)) may be reduced. Meanwhile, when the minimum resource allocation unit is reduced, the communication system may be greatly affected. Accordingly, the satellite may orthogonally overload a plurality of UE signals having low transmission rates through spreading codes having orthogonality while maintaining the minimum resource allocation unit of the communication system. Accordingly, the satellite can improve coverage by securing a link margin of each UE through a spreading gain without reducing the overall capacity.

In exemplary embodiments, a base station may be located at a terrestrial or non-terrestrial site. A base station located at a terrestrial site may be referred to as a terrestrial base station. A base station located at a non-terrestrial site may be referred to as a non-terrestrial base station. A base station may mean a terrestrial base station and/or a non-terrestrial base station. In NTN, a non-terrestrial base station may be located within a satellite. Alternatively, in NTN, a non-terrestrial base station may be located separately from a satellite. In exemplary embodiments, operations of a satellite may be described as operations of a non-terrestrial base station. In addition, operations of a satellite may be applied to a terrestrial base station. That is, a terrestrial base station may perform the same or similar operations as those of a satellite.

Figure 7:
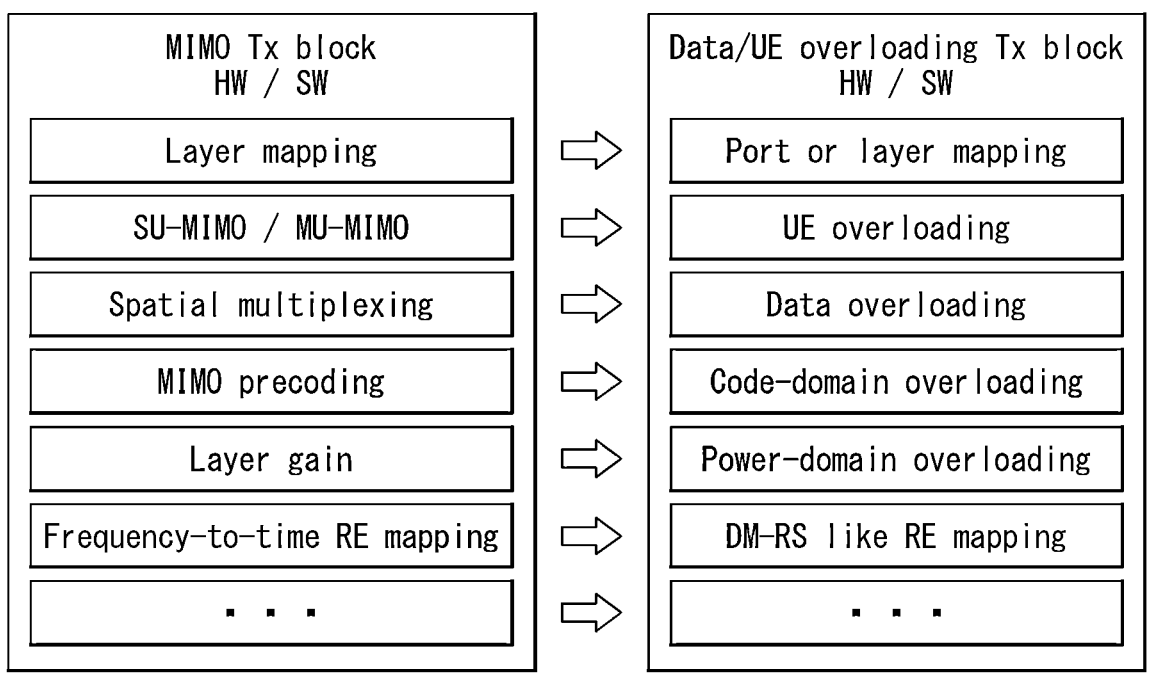
FIG. 7 is a conceptual diagram illustrating a first exemplary embodiment of a data and/or UE overloading transmission structure.

FIG. 7 is a conceptual diagram illustrating a first exemplary embodiment of a data and/or UE overloading transmission structure.

Referring to FIG. 7, a MIMO transmission (Tx) block HW/SW of a satellite (e.g., base station) may be mapped with a data and/or UE overloading transmission block HW/SW. The MIMO transmission block of the satellite may have a layer-based transmission structure to apply MIMO-based spatial multiplexing, diversity, and/or beamforming techniques. A layer mapping unit of the MIMO transmission block of the satellite may be mapped with a port or layer mapping unit of the data and/or UE overloading transmission block. A SU-MIMO/MU-MIMO unit of the MIMO transmission block of the satellite may be mapped with a UE overloading unit of the data and/or UE overloading transmission block. A spatial multiplexing unit of the MIMO transmission block of the satellite may be mapped with a data overloading unit of the data and/or UE overloading transmission block. A MIMO precoding unit of the MIMO transmission block of the satellite may be mapped with a code-domain overloading unit of the data and/or UE overloading transmission block. A layer gain unit of the MIMO transmission block of the satellite may be mapped with a power-domain overloading unit of the data and/or UE overloading transmission block. A frequency-to-time RE mapping unit of the MIMO transmission block of the satellite may be mapped with a DM-RS like RE mapping unit of the data and/or UE overloading transmission block.

Meanwhile, the MIMO transmission block of the satellite may not utilize the MIMO techniques due to difficulty in applying MIMO techniques due to the lack of DoF of the satellite channel in NTN. Therefore, a method of utilizing the MIMO transmission block that is not used by the satellite as a transmission structure for data and/or UE overloading may be considered. Basically, MIMO techniques may be regarded as having a concept of overloading a plurality of data and/or UEs in the space domain. Accordingly, in order to overload a plurality of data and/or UEs, the satellite may transform and use data and/or UE overloading in the space domain of MIMO to data and/or UE overloading in the code and/or power domain.

In the data and/or UE overloading transmission technique, per-layer MIMO operations in MIMO transmission of the satellite may be changed to overloading different data or UE for each port as well as a MIMO layer. The layer-based SU-MIMO or MU-MIMO transmission structure of the satellite may be used for layer- and/or port-based UE overloading. In addition, a layer-based spatial multiplexing unit of the satellite may be used for layer- and/or port-based data overloading.

Meanwhile, the satellite may replace a precoding application block applied in MIMO transmission with a block applying an overloading signature (e.g., spreading code) in the code domain. In this case, in the case of a block applying different gains between layers, a precoding application block applied in MIMO transmission of the satellite may be replaced with a power allocation block for overloading in the power domain. Accordingly, by performing data and/or UE overloading by utilizing the MIMO transmission block of the satellite, it is possible to minimize the impacts on the technical specifications of the communication system and to minimize changes in the HW/SW of the terminal and/or the base station. In addition, according to this, the number of channels that can be simultaneously accessed may be increased, frequency efficiency may be increased, and coverage may be extended while maintaining compatibility with radio interfaces of the communication system.

Figure 8:
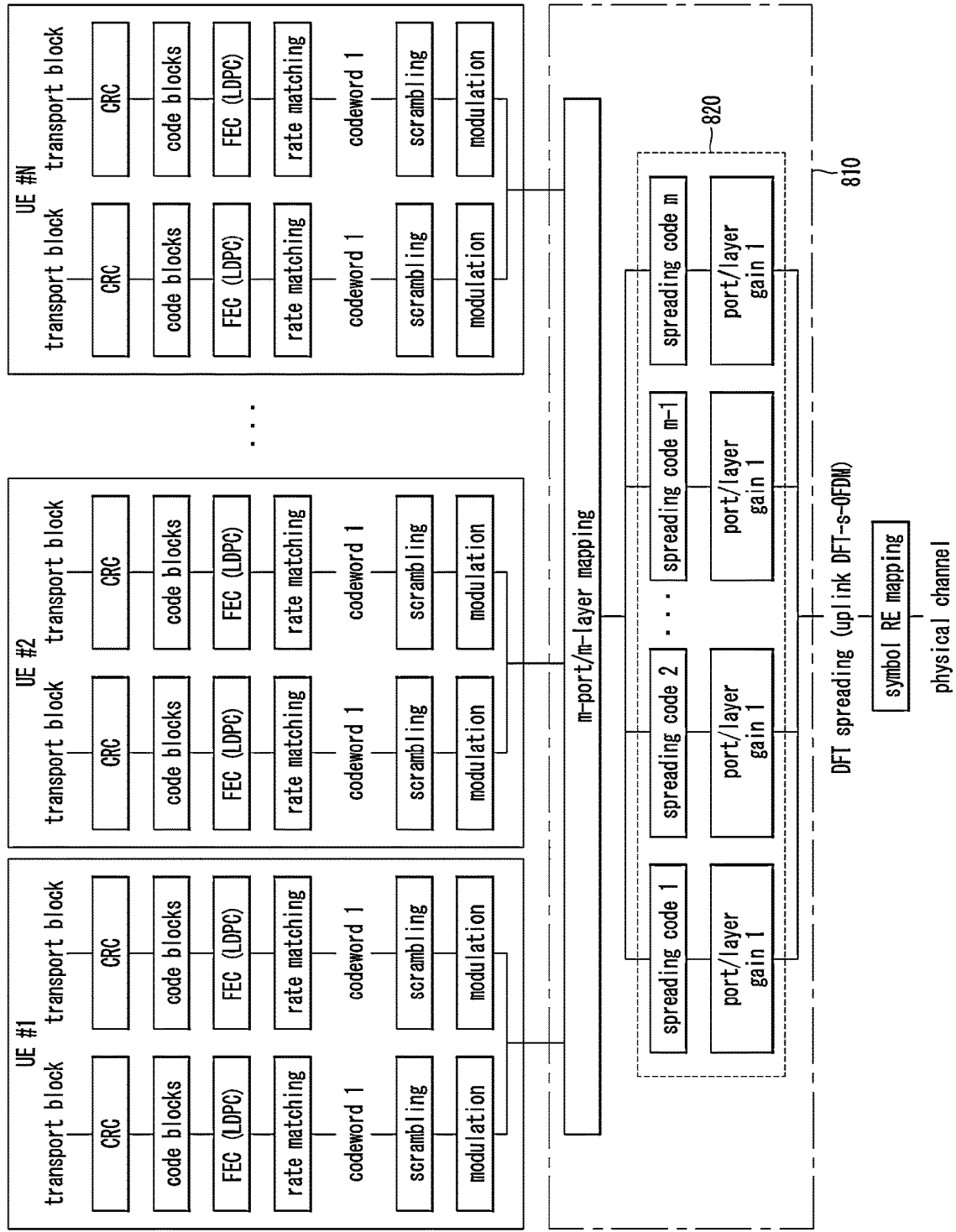
FIG. 8 is a conceptual diagram illustrating a second exemplary embodiment of a data and/or UE overloading transmission structure.

FIG. 8 is a conceptual diagram illustrating a second exemplary embodiment of a data and/or UE overloading transmission structure.

Referring to FIGS. 7 and 8 together, a data and/or UE overloading transmission structure utilizing the MIMO transmission block structure as shown in FIG. 7 may be applied to the entire communication system. 810 of FIG. 8 may indicate a portion requiring change in the MIMO transmission block of the communication system, and 820 of FIG. 8 may indicate a portion to be newly added, such as spreading code and/or optimal transmit power allocation, among portions requiring change.

Accordingly, the transmission structure for application of MIMO techniques in the mobile communication system may be used for data and/or UE overloading, and the same code spreading block structure may be added to the MIMO transmission structure regardless of the purpose of overloading. In addition, according to this, in order to perform data and/or UE overloading in the same resource based on a spreading code, a RE mapping structure for DM-RS symbols for each port may be applied as it is. In addition, according to this, it is possible to propose a data and/or UE overloading transmission method and/or structure in a radio interface to which an open loop-based transmission structure, rather than a UE measurement report-based transmission structure, is applied.

As an exemplary embodiment, the data and/or UE overloading method may use the MIMO transmission structure of the communication system for other purposes for transmission for data and/or UE overloading. The data and/or UE overloading method may include a step of mapping each data and/or UE to be overloaded in the MIMO transmission structure to a port instead of a layer. In addition, the data and/or UE overloading method may include a step of configuring a scalable and low-complexity spreading code and/or transmit power allocation-based overloading signature, which is suitable for a strong LoS satellite channel environment.

In addition, the data and/or UE overloading method may include a step of mapping a scalable and low-complexity spreading code and/or transmit power allocation-based overloading signature with data and/or UE to be overloaded. In addition, the data and/or UE overloading method may apply a DM-RS symbol mapping structure applied in each port mapped with the data and/or UE to be overloaded, and map overloaded data and/or UE symbols based on each overloading signature.

As another exemplary embodiment, the data and/or UE overloading transmission structure may include a first transmission unit that uses the MIMO transmission structure of the communication system for other purposes for transmission for data and/or UE overloading. In addition, the data and/or UE overloading transmission structure may include a second transmission unit for mapping a port to each data and/or UE to be overloaded instead of a layer applied in the MIMO transmission structure. In addition, the data and/or UE overloading transmission structure may include a third transmission unit that configures a scalable, low-complexity spreading code and/or transmit power allocation-based overloading signature suitable for a strong LoS satellite channel environment. In addition, the data and/or UE overloading transmission structure may include a fourth transmission unit for mapping an overloading signature with data and/or UE to be overloaded based on a spreading code and/or transmit power allocation. In addition, the data and/or UE overloading transmission structure may include a fifth transmission unit for mapping symbols of data and/or UEs to be overloaded based on each overloading signature by applying a DM-RS symbol mapping structure in each port mapped with data and/or UEs to be overloaded.

For spreading codes applied for data and UE overloading, Welch's Bound Equality (WBE), which shows optimal performance in a TN's Gaussian channel environment operating in a multi-path fading channel environment, may be considered. In addition, in generating an overloading signature based on transmit power allocation, which is applied for data and UE overloading, the satellite (e.g., base station) may consider transmit power allocation based on the same power for obtaining a diversity gain due to multipath fading from a channel gain. However, since the NTN's satellite channel environment may be a strong LoS environment, the satellite may operate in a flat fading channel environment similar to an AWGN channels or with little channel variation. In this case, since the channel environment of the satellite is closer to a binary channel environment than the Gaussian channel environment, codes optimal for the binary channel environment may be applied. In addition, the satellite may use a ±1 or integer-based spreading code that can reduce implementation complexity in order to reduce implementation complexity. In addition, in the case of codes showing optimal performance, such as WBE, a code showing optimal performance may be different depending on overloaded data or the number of overloaded UEs, and it may be difficult to apply the code in a scalable manner. Therefore, the satellite may apply an overloading signature based on a spreading code to which a Walsh Hadamard code is applied, so that the code is scalable to be applicable to both non-orthogonal overloading or orthogonal overloading based on the same code design scheme. Walsh-Hadamard codes may have orthogonality and may be applicable to the low-rate data-based coverage enhancement transmission scenario (e.g., scenarios of FIGS. 4 to 6) as they are. In addition, since the Walsh-Hadamard code is widely used in the existing communication systems, it is possible to minimize the impact on the technical specifications of existing communication systems.

On the other hand, in the case of the scenarios of FIGS. 4 and 5, non-orthogonal data and/or UE overloading may need to be considered, and accordingly, a case where the number M of overloaded data or a plurality of UEs is greater than a code length L may occur. In this case, the satellite may generate an additional code having non-orthogonality from the Walsh-Hadamard code as shown in Equation 1 below. The data and/or UE overloading transmission method of the present disclosure may include both orthogonal overloading and non-orthogonal overloading cases, and accordingly, the communication system may apply a code that can be scalably applied in both of the above cases. That is, when the number M of overloaded data or UEs is less than or equal to the length L of the Walsh-Hadamard code, the satellite may use one of L Walsh-Hadamard orthogonal codes having a length L as shown in Equation 1 below. Alternatively, when the number M of overloaded data or UEs is greater than the length L of the Walsh-Hadamard code, the communication system may use L Walsh-Hadamard codes having the orthogonality of Equation 1 below and the remaining (M-L) codes having non-orthogonality of Equation 2 below.

$$\text{overloading signature}_n = \begin{cases} W_L^n (1 \le n \le L) \\ G * W_L^{n-L} (L < n \le M) \end{cases} \quad \text{[Equation 1]}$$

Here, $W_L^n$ represents a Walsh Hadamard code, G is defined as $G = \text{diag}\{g_1, g_2, \ldots, g_L\}$, $g_i$ may be set so that a cross-correlation between L Walsh-Hadamard codes generated by $W_L^n$ of Equation 1 and (M-L) codes generated by $G * W_L^{n-L}$ of Equation 1 is minimized.

The spreading code-based configuration of the overloading signature configured by Equation 1 above may be combined with a transmit power allocation that makes reception signals of the overloaded data or UEs the same level, and/or combined with a transmit power allocation that makes a cross-correlation between the overloading signatures small. When the spreading code-based configuration of the overloading signature is combined with a transmit power allocation that makes a cross-correlation between overloading signatures small, the satellite may increase a DoF for distinguishing the signatures and improve overloading performance. When the spreading code-based configuration of the overloading signature is combined with a transmit power allocation that reduces the cross-correlation between overloading signatures, the overloading signature may be determined by combining the spreading code of Equation 1 and/or Equation 2 and the transmit power allocation.

$$\text{overloading signature}_n = \begin{cases} H^n * W_L^n (1 \le n \le L) \\ Q^n * W_L^{n-L} (L < n \le M) \end{cases} \quad \text{[Equation 2]}$$

Here, $W_L^n$ represents a Walsh Hadamard code, $H^n$ is be defined as $H^n = \text{diag}\{h_1^n, h_2^n, \ldots, h_L^n\}$, $Q^n = \text{diag}\{q_1^n, q_2^n, \ldots, q_L^n\}$ and $h_i^n$ and $q_i^n$ may be set so that a cross-correlation between L Walsh-Hadamard codes generated by $H^n * W_L^n$ of Equation 2 and (M-L) codes generated by $Q^n * W_L^{n-L}$ of Equation 2 is minimized.

The satellite (e.g., base station) may configure the overloading signature in the above-described manner, and may transmit a message including information (e.g., mapping information) related to the configured overloading signature to the terminal. When the satellite configures a spreading code-based overloading signature in the above-described manner, unlike data and UE overloading based on non-orthogonal overloading signatures, overloading transmission for coverage enhancement based on low-rate data may be applied without changing the signature. In this case, the overloading signature may use up to L codes based on a Walsh-Hadamard code having a length of L in order to secure orthogonality between overloading signals for securing a high reliability link. Accordingly, although the transmission rate of each UE may be reduced to 1/L, a link margin may be additionally secured by 10log10 (L). Therefore, it is possible to improve the service coverage of the terminal and/or secure the link reliability. Considering the minimum resource allocation unit and the lowest MCS mode of the existing communication system, the minimum transmission rate may be tens of kbps. However, considering that a voice service corresponding to several kbps can be provided based on a voice codec supporting a low-rate in the case of NTN, a link margin of 3 or 6 dB may be secured by applying the spreading codes having a length of 2, 4 or more, and accordingly, the coverage can be improved.

On the other hand, the Walsh-Hadamard code-based signature generation of Equations 1 and 2 above may not satisfy the WBE code characteristics and may not guarantee optimal performance. Therefore, for performance optimization, the satellite may use a truncated code having a length of L from a discrete Fourier transform (DFT) matrix as shown in Equation 3 below. Since the DFT matrix is used as a precoder for MIMO transmission in the existing communication system, it may have little impacts on the technical specifications and/or implementation of the communication system. In addition, the DFT code may have a low peak-to-average power ration (PAPR), and thus may be advantageous in a transmission side. Meanwhile, a Zadoff-Chu code may also be considered instead of the DFT code, but in the case of Zadoff-Chu code, there may be combinations that do not satisfy the WBE characteristics depending on combinations of (L, M). Accordingly, the satellite may use the DFT matrix-based codes for scalable application.

$$\text{overloading signature}_n = H^n * [\exp(-j*2\pi* \frac{(0+\text{offset})}{M*n}), \quad \text{[Equation 3]}$$
$$\exp(-j*2\pi* \frac{(1+\text{offset})}{M*n}), \ldots ,$$
$$\exp(-j*2\pi* \frac{(L-2+\text{offset})}{M*n}),$$
$$\exp(-j*2\pi* \frac{(L-1+\text{offset})}{M*n})], (1 \le n \le M)$$

Here, $H^n$ is defined as $H^n = \text{diag}\{h_1^n, h_2^n, \ldots, h_L^n\}$, and the offset may represent an offset value indicating a position at which the truncation of the DFT matrix having a length of M starts. Regardless of the offset position, a truncated code having a length of L may satisfy the WBE characteristics. For example, when L=4 and M=5, 6, 7, 8, 9, or 10, regardless of the offset value, a sum of squared values of the cross-correlation between the overloading signatures generated by Equation 3 above may have a value of 6.25 (when M=6), 9 (when M=6), 12.25 (when M=7), 16 (when M=8), 20.25 (when M=9), or 25 (when M=9)=10), which may satisfy the Welch bound value (M2/L). H″ is a value corresponding to a gain assigned to a port or layer to be mapped, and may be equally assigned as 1, and a different gain value may be applied depending on channel characteristics between ports or layers and UE capability.

Figure 9:
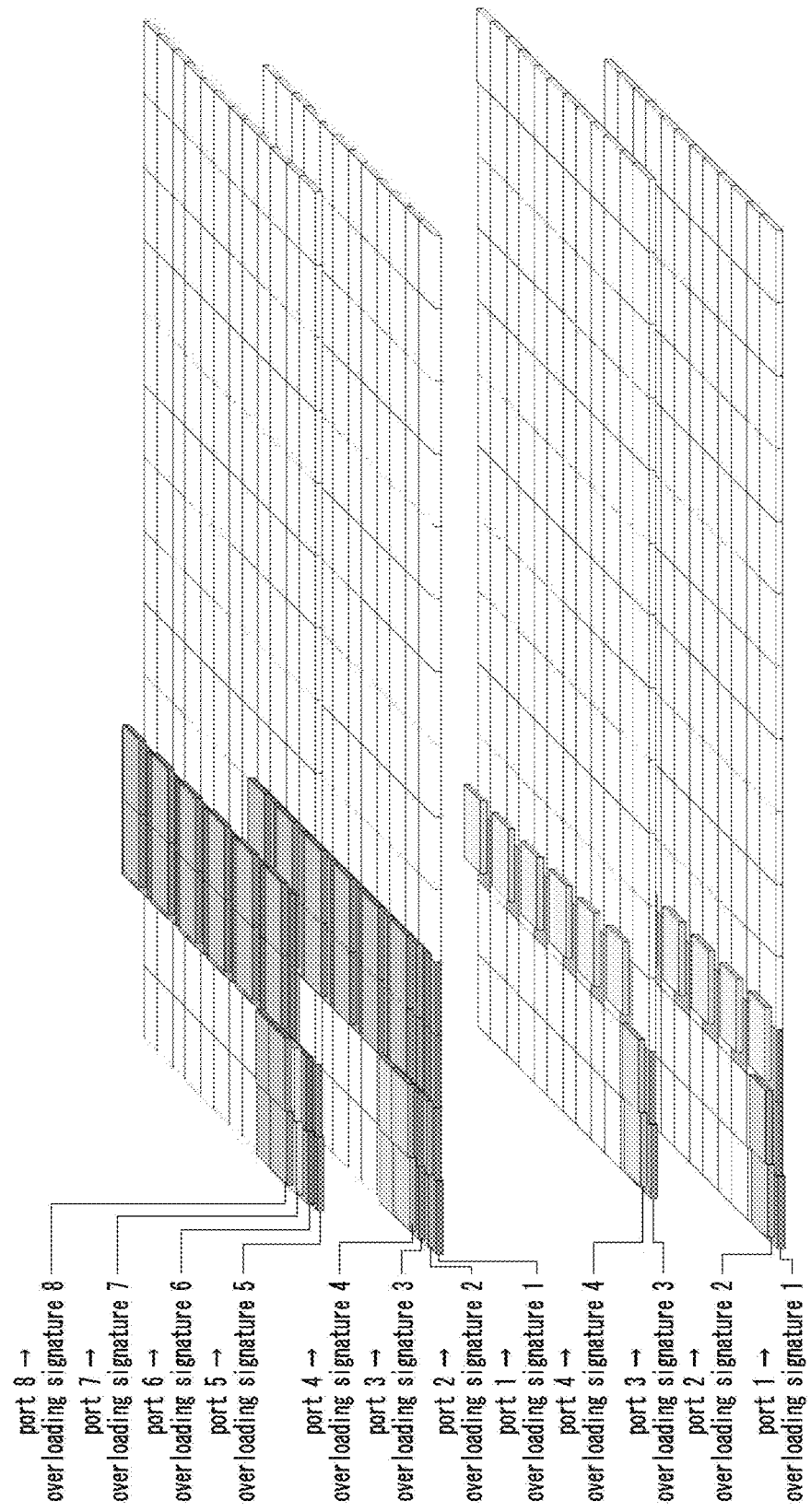
FIG. 9 is a conceptual diagram illustrating a first exemplary embodiment of a RE mapping relationship for overloading symbols of data and/or UEs.

FIG. 9 is a conceptual diagram illustrating a first exemplary embodiment of a RE mapping relationship for overloading symbols of data and/or UEs.

Referring to FIG. 9, a RE mapping relationship for overloading symbols of up to 4 and 8 data and/or UEs may be configured based on the overloading signatures configured through Equation 1 or Equation 2. The satellite (e.g., base station) may transmit a message including information on the configured RE mapping relationship to the terminal. The terminal may identify the RE mapping relationship between symbols of data and/or UEs based on information on the configured RE mapping relationship, and perform decoding based on the identified RE mapping relationship. Alternatively, the satellite may support overloading of different numbers of data and/or UEs through RE mapping in a similar manner. As shown in FIG. 9, mapping of 2, 4, 6, 8, 12, 16, 24, or 36 DM-RSs having orthogonality may be possible according to the number of ports. Therefore, data and/or UE overloading corresponding to the number of DM-RS ports having orthogonality may be possible, and the length L of the spreading code-based overloading signature used for data and/or UE overloading may be set equal to the length of DM-RS. Accordingly, for example, when the DM-RS type 1 of NR is used, the length of DM-RS may be 2 or 4, and the satellite may perform overloading of up to 4 data and/or UEs by using a spreading code having a length of 2 or 4. In addition, when a DM-RS having a length of 4 in the DM-RS type 2 is used, the number of DM-RS ports with orthogonality may be up to 12, and the satellite may perform overloading of up to 12 data and/or UEs by using spreading codes having a length of 4 or 8. In addition, when a DM-RS having a length of 8 in the DM-RS type 2 is used, the number of DM-RS ports with orthogonality may be up to 32, and the satellite may perform overloading of up to 32 data and/or UEs by using spreading codes having a length of 4, 8, or 16.

According to the present disclosure, the number of simultaneous accessible channels can be increased, frequency efficiency can be increased, and coverage can be extended through transmission of overloaded data and UEs in the wireless communication system. In addition, according to the present disclosure, compatibility with radio interfaces of the existing communication system can be maintained, and the transmitter structure and the specifications of the existing communication system can be minimally affected. That is, according to the present disclosure, in a communication system with a large cell radius, large Doppler shift, long round-trip delay time, and/or power limitation, the maximum transmission rate of UEs, perceived transmission rate of UEs, and the number of concurrently supported UEs can be increased while maintaining maximum compatibility with the existing communication system, and the service coverage and link reliability can be improved. In addition, according to the present disclosure, the transmission rate of UEs can be increased, the number of concurrently supported UEs can be increased, and the coverage can be extended by overloading data and/or UEs on the same resources according to the purpose based on low complexity implementation. In addition, according to the present disclosure, performance optimization can be achieved in a strong LoS NTN channel environment, unlike the existing TN channel environment. In addition, according to the present disclosure, transmission that is robust to fast Doppler shift with low complexity may be possible, and performance degradation due to a long round-trip delay time of the satellite may be prevented.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a base station, comprising:
mapping at least one port of the base station to each of a plurality of user equipments (UEs) to be overloaded;
configuring overloading signatures for a code division multiplexing (CDM) scheme;
mapping the overloading signatures with the plurality of UEs to be overloaded, respectively;
transmitting a message including configuration information of the overloading signatures to the plurality of UEs; and
transmitting, to the plurality of UEs, signals multiplexed by the CDM scheme using the overloading signatures, wherein first overloading signatures mapped to (M-L) UEs are set so that a cross correlation between second overloading signatures mapped to L UEs and the first overloading signatures is minimized, the overloading signatures include the first overloading signatures and the second overloading signatures, M is a number of the plurality of UEs to be overloaded, L is a length of a Walsh Hadamard code and each of M and L is a natural number.

2. The method according to claim 1, wherein when the number M of the plurality of UEs to be overloaded is less than or equal to the length L of the Walsh Hadamard code, the overloading signatures are configured based on L Walsh Hadamard codes having orthogonality, and when the number M of the plurality of UEs to be overloaded is greater than the length L of the Walsh Hadamard code, the overloading signatures are configured based on L Walsh Hadamard codes having orthogonality and (M-L) non-orthogonal codes.

3. The method according to claim 1, wherein the overloading signatures are configured based on an equation $$\text{overloading signature}_n = \begin{cases} W_L^n (1 \leq n \leq L) \\ G * W_L^{n-L} (L < n \leq M) \end{cases},$$

$W_L^n$ is the Walsh Hadamard code, G is defined as $G = \text{diag}\{g_1, g_2, \ldots, g_L\}$, $g_i$ is set so that a cross-correlation between $W_L^n$ and $G*W_L^{n-L}$ is minimized.

4. The method according to claim 1, wherein the overloading signatures are configured based on an equation $$\text{overloading signature}_n = \begin{cases} H^n * W_L^n (1 \leq n \leq L) \\ Q^n * W_L^{n-L} (L < n \leq M) \end{cases},$$

$W_L^n$ is the Walsh Hadamard code, $H^n$ is defined as $H^n = \text{diag}\{h_1^n, h_2^n, \ldots, h_L^n\}$, $Q^n$ is defined as $Q^n = \text{diag}\{q_1^n, q_2^n, \ldots, q_L^n\}$, and $h_i^n$ and $q_i^n$ are set so that a cross-correlation between $H^n*W_L^n$ and $Q^n*W_L^{n-L}$ is minimized.

5. The method according to claim 1, wherein the overloading signatures are configured based on an equation $$\text{overloading signature}_n = H^n * [\exp(-j*2\pi * \frac{(0+\text{offset})}{M*n}),$$
$$\exp(-j*2\pi * \frac{(1+\text{offset})}{M*n}), \ldots,$$
$$\exp(-j*2\pi * \frac{(L-2+\text{offset})}{M*n}),$$
$$\exp(-j*2\pi * \frac{(L-1+\text{offset})}{M*n})], (1 \leq n \leq M),$$

$H^n$ is defined as $H^n = \text{diag}\{h_1^n, h_2^n, \ldots, h_L^n\}$, offset indicates a starting position of truncation of a discrete Fourier transform (DFT) matrix.

6. A method of a user equipment (UE), comprising:
receiving, from a base station, a message including configuration information of an overloading signature for a code division multiplexing (CDM) scheme;
receiving, from the base station, signals multiplexed by the CDM scheme according to the overloading signature;
identifying a resource element (RE) mapping relationship between the overloading signature and a symbol based on the overloading signature; and
decoding the signals based on the RE mapping relationship between the overloading signature and the symbol,
wherein the overloading signature is set so that a cross correlation between overloading signatures mapped to L UEs and the overloading signature is minimized, the plurality of UEs include both L UEs and the UE, each of M and L is a natural number, L is a length of a Walsh Hadamard code and L is a natural number.

7. The method according to claim 6, wherein when a number M of the plurality of UEs to be overloaded is less than or equal to the length L of the Walsh Hadamard code, the overloading signatures are configured based on L Walsh Hadamard codes having orthogonality, and when the number M of the plurality of UEs to be overloaded is greater than the length L of the Walsh Hadamard code, the overloading signatures are configured based on L Walsh Hadamard codes having orthogonality and (M-L) non-orthogonal codes.

8. A base station comprising:
a processor; and
a memory storing one or more instructions executable by the processor,
wherein the one or more instructions are executed to perform:
mapping at least one port of the base station to each of a plurality of user equipments (UEs) to be overloaded;
configuring overloading signatures for a code division multiplexing (CDM) scheme;
mapping the overloading signatures with the plurality of UEs to be overloaded, respectively;
transmitting a message including configuration information of the overloading signatures to the plurality of UEs; and
transmitting, to the plurality of UEs, signals multiplexed by the CDM scheme using the overloading signatures,
wherein first overloading signatures mapped to (M-L) UEs are set so that a cross correlation between second overloading signatures mapped to L UEs and the first overloading signatures is minimized, the overloading signatures include the first overloading signatures and the second overloading signatures, M is a number of the plurality of UEs to be overloaded, L is a length of a Walsh Hadamard code and each of M and L is a natural number.

9. The base station according to claim 8, wherein the overloading signatures are configured based on spreading codes and transmit power allocation.

10. The base station according to claim 8, wherein when the number M of the plurality of UEs to be overloaded is greater than the length L of the Walsh Hadamard code, the overloading signatures are configured based on L Walsh Hadamard codes having orthogonality and (M-L) non-orthogonal codes, and when the number M of the plurality of UEs to be overloaded is less than or equal to the length L of the Walsh Hadamard code, the overloading signatures are configured based on L Walsh Hadamard codes having orthogonality.

11. The base station according to claim 8, wherein the overloading signatures are configured based on an equation $$\text{overloading signature}_n = \begin{cases} H^n * W_L^n (1 \leq n \leq L) \\ Q^n * W_L^{n-L} (L < n \leq M) \end{cases},$$

$W_L^n$ is the Walsh Hadamard code, $H^n$ is defined as $H^n = \text{diag}\{h_1^n, h_2^n, \ldots, h_L^n\}$, $Q^n$ is defined as $Q^n = \text{diag}\{q_1^n,$ $q_2^n, \ldots, q_L^n\}$, and $h_i^n$ and $q_i^n$ are set so that a cross-correlation between $H^n * W_L^n$ and $Q^n * W_L^{n-L}$ is minimized.

* * * * *